United States Patent [19]

Vega

[11] 4,076,645
[45] Feb. 28, 1978

[54] CHEMICAL LIGHTING PROCESS AND COMPOSITION

[75] Inventor: Mary-Louise Vega, Califon, N.J.

[73] Assignee: American Cyanamid Company, Stamford, Conn.

[21] Appl. No.: 758,253

[22] Filed: Jan. 10, 1977

[51] Int. Cl.$^2$ .............................................. C09K 11/00
[52] U.S. Cl. ........................... 252/188.3 CL; 252/186; 252/301.16
[58] Field of Search ............ 252/188.3 CL, 186, 301.2

[56] References Cited

U.S. PATENT DOCUMENTS

| | | | |
|---|---|---|---|
| 3,691,085 | 9/1972 | Roberts et al. | 252/188.3 CL |
| 3,704,231 | 11/1972 | Bollyky | 252/188.3 CL |
| 3,749,679 | 7/1973 | Rauhut | 252/188.3 CL |
| 3,775,336 | 11/1973 | Kasulin et al. | 252/188.3 CL |
| 3,888,786 | 6/1975 | Maulding | 252/188.3 CL |
| 3,994,820 | 11/1976 | Maulding et al. | 252/188.3 CL |

Primary Examiner—Richard E. Schafer
Assistant Examiner—Christine M. Nucker
Attorney, Agent, or Firm—Gordon L. Hart

[57] ABSTRACT

In producing chemiluminescence by the reaction of bis(6-carbopentoxy-2,4,5-trichlorophenyl)oxalate with a peroxide in presence of 9,10-bis(phenylethynyl)anthracene the initial luminosity on mixing these reaction components in a suitable diluent is increased by using the specific concentration of bis-oxalate ester component in the range from 0.05 to 0.09 mole per liter in the reaction mixture.

5 Claims, No Drawings

CHEMICAL LIGHTING PROCESS AND COMPOSITION

This invention relates to an improved process for generating chemiluminescence and an improved chemiluminescent composition. More particularly, this invention is concerned with reacting bis(6-carbopentoxy-2,4,5-trichlorophenyl)oxalate and a peroxide in a diluent in the presence of a 9,10-bis-(phenylethynyl)anthracene to optimize the intensity of light emitted in the first 30 minutes of the reaction.

Under certain circumstances, it is desirable to have a source of visible light which is not electrically activated. Light can be provided by chemical systems, wherein the luminosity is solely the result of a chemical reaction without provision of any electrical energy. Such light is known as chemiluminescent light.

Chemiluminescent light may be useful where there is no source of electricity. For example, in emergencies where sources of electrical power have failed, a chemiluminescent system could provide light. Since the system requires no externally generated source of energy, devices can be made small and highly portable. Moreover, chemiluminescent light is cold light and can be used where the heat of conventional illumination is not desired. It is also useful where electrical means could cause a fire hazard, such as in the presence of inflammable agents. Chemiluminescent light is also effective under water since there are no electrical connections to short out. Thus it may be seen that chemiluminescent light can have many useful applications.

The art of generating light from chemical energy, i.e., chemiluminescence, is continually in search of processes and compositions which will emit light of substantially improved intensity as contrasted with known processes and compositions. Obviously, improved processes and compositions are constantly in demand for use in signal devices, area illumination, and the like. The term "light," as used herein, is defined as electromagnetic radiation at wavelengths falling between about 350 m$\mu$ and 800 m$\mu$.

In certain emergency situations, such as marine disasters, it is of utmost importance that the survivors be located quickly, otherwise they may soon be carried out of sight by the water current. This is particularly true at night.

There is need, therefore, for a process and a chemiluminescent composition whereby the intensity of the light emitted is significantly increased within the first 30 minutes after the chemical reaction is initiated.

There is also a need for a process and a chemiluminescent composition whereby higher light intensity is obtained utilizing less chemical reactant.

The use of compositions comprising a bis(6-carboalkoxy-2,4,5-trichlorophenyl)oxalate and 9,10-bis(phenylethynyl)anthracene in an organic solvent for reaction with hydrogen peroxide to produce chemiluminescence is disclosed in U.S. Pat. No. 3,749,679 by Rauhut.

SUMMARY OF THE INVENTION

In accordance with the present invention there is provided an improved process for generating chemiluminescence comprising mixing bis(6-carbopentoxy-2,4,5-trichlorophenyl) oxalate, a peroxide component, and sufficient diluent in the presence of a 9,10-bis(-phenylethylyl)anthracene compound to provide an initial concentration of bis(6-carbopentoxy-2,4,5-trichlorophenyl)oxalate of about 0.05 to about 0.09 mole per liter of reaction mixture. There is also provided a chemiluminescent composition obtained by the improved process of this invention.

In a preferred embodiment of this invention the initial concentration of bis(6-carbopentoxy-2,4,5-trichlorophenyl)oxalate is about 0.06 to about 0.08 mole per liter of of reaction mixture.

The improved process of this invention and the chemiluminescent composition obtained thereby provides a 10 to 20% increase in emission intensity during the first 30 minutes of reaction.

The improved process of this invention effects a saving of 25 to 40% in the bis(6-carbopentoxy-2,4,5-trichlorophenyl)oxalate used.

DESCRIPTION OF PREFERRED EMBODIMENTS

The term "chemiluminescent composition," as used herein, means a mixture which emits light by a chemical reaction.

The term "bis(6-carbopentoxy-2,4,5-trichlorophenyl) oxalate" is abbreviated herein as CPPO.

The term "peroxide component," as used herein, means a solution of a hydrogen peroxide compound, a hydroperoxide compound or a peroxide compound in a suitable diluent.

The term "hydrogen peroxide compound" includes (1) hydrogen peroxide and (2) hydrogen peroxide-producing compounds.

The term "hydroperoxide compound," as used herein, is limited to peroxide compounds having at least one HOO-group, or a compound which upon reaction produces the peroxide group.

The term "peroxide compound," as used herein, also includes compounds which upon reaction produce the peroxide group.

The term "diluent," as used herein, means a solvent or a vehicle which when employed in a component does not cause insolubility.

The term "9,10-bis(phenylethynyl)anthracene compound," as used herein, refers to 9,10-bis(phenylethynyl)anthracene and substituted 9,10-bis(phenylethynyl)anthracenes as disclosed and claimed in U.S. Pat. No. 3,888,786 which is incorporated herein by reference.

The 9,10-bis(phenylethynyl)anthracenne compounds contemplated herein may be defined as 9,10-bis(-phenylethynyl) anthracene, or chloro, bromo, fluoro, or lower alkyl-substituted bis(phenylethynyl)anthracenes. The preferred compound is selected from 9,10-bis(-phenylethynyl)anthracene or chlorosubstituted 9,10-bis(phenylethynyl)anthracenes. More preferably the compound is selected from 9,10-bis(phenylethynyl) anthracene, 1-chloro-9,10-bis(phenylethynyl)anthracene, or 2-chloro-9,10-bis(phenylethynyl)anthracene.

Illustrative of the 9,10-bis(phenylethynyl)anthracenes which can be used in this invention are the following:
9,10-bis(phenylethynyl)anthracene,
1-chloro-9,10-bis(phenylethynyl)anthracene,
2-chloro-9,10-bis(phenylethynyl)anthracene,
1,5-dichloro-9,10-bis(phenylethynyl)anthracene,
1,8-dichloro-9,10-bis(phenylethynyl)anthracene,
1-bromo-9,10-bis(phenylethynyl)anthracene,
1-fluoro-9,10-bis(phenylethynyl)anthracene,
1-methyl-9,10-bis(phenylethynyl)anthracene,
and the like.

The concentration of the 9,10-bis(phenylethynyl)anthracene compound in the reaction mixture obtained by the process of this invention may range from about 0.0002M to about 0.03M. Preferably, the concentration ranges from about 0.001M to about 0.010M.

The diluents which are used in the process of this invention must be present in sufficient amounts to provide the desired initial concentration of CPPO in the chemiluminescent composition. Any fluid diluent can be employed providing said dilutent solubilizes the CPPO to provide initial concentrations of CPPo in the reacting system from about 0.05M to about 0.09M, inclusive, preferably from about 0.06M to about 0.08M, inclusive, and is non-reactive toward the CPPO. Typical diluents, or solvents, which can be used include esters, ethers, aromatic hydrocarbons, chlorinated aliphatic and aromatic hydrocarbons such as those disclosed in U.S. Pat. No. 3,749,679. The preferred diluent is dibutyl phthalate. Solvent combinations may, of course, be used but such combinations should not include strongly electron donating solvents.

As previously stated, the peroxide component may be any peroxide, hydroperoxide, or hydrogen peroxide compound. Typical hydroperoxides include t-butylhydroperoxide, peroxybenzoic acid, and hydrogen peroxide. Hydrogen peroxide is the preferred hydroperoxide and may be employed as a solution of hydroen peroxide in a solvent or as an anhydrous hydrogen peroxide compound such as perhydrate of urea (urea peroxide), sodium perborate, sodium peroxide, and the like. Whenever hydrogen peroxide is contemplated to be employed, any suitable compound may be substituted which will produce hydrogen peroxide.

Diluents which can be employed in the peroxide component include any fluid which is relatively unreactive toward the hydroperoxide, the CPPO and the 9,10-bis(phenylethynyl) anthracene, and which accommodates a solubility to provide at least 0.01M hydroperoxide. Typical solvents for the hydroperoxide component include water; alcohols, such as ethanol, tertiary butanol, or octanol; ethers, such as diethyl ether, diamyl ether, tetrahydrofuran, dioxane, dibutyldiethyleneglycol, perfluoropropyl ether, and 1,2-bi-methoxyethane; and esters, such as ethyl acetate, ethyl benzoate, dimethyl phthalate, dioctylphthalate, propyl formate. Solvent combinations can, of course, be used such as combinations of the above with anisole, tetralin, and polychlorobiphenyls, providing said solvent combination acommodates hydroperoxide solubility. However, strong electron donor solvents such as dimethyl formamide, dimethyl sulfoxide, and hexamethylphosphoramide should not, in general, be used as a major diluent for the peroxide component.

The preferred diluent for the peroxide component is a mixture of about 80 volume percent dimethyl phthalate and about 20 volume percent tertiary butanol.

The hydrogen peroxide concentration in the peroxide component may range from about 0.2M to about 15M. Preferably, the concentration ranges from about 1M to about 2M.

The peroxide component comprises from about 15 to about 33 volume percent of the reaction mixture.

The lifetime and intensity of the chemiluminescent light emitted can be regulated by the use of certain regulators such as:

(1) By the addition of a catalyst which changes the rate of reaction of hydroperoxide with the oxalate ester. Catalysts which accomplish the objective include those described in M. L. Bender, "Chem. Revs.", Vol. 60, p. 53 (1960) Also, catalysts which alter the rate of reaction or the rate rate of chemiluminescencee include those accelerators of U.S. Pat. No. 3,775,366, and decelerators of U.S. Pat. Nos. 3,691,085 and 3,704,231.

(2) By the variation of hydroperoxide. Both the type and the concentration of hydroperoxide are critical for the purposes of regulation. (3) By the addition of water.

Preferably, a weakly basic accelerator, such as sodium salicylate, is included in the peroxide component to control the lifetime of the chemical lighting system. The concentration of weakly basic accelerator used in the peroxide compound may range from about $10^{-5}$M to about $10^{-2}$M, perferably from about $10^{-4}$M to about $10^{-3}$M. Optionally the weak base may be incorporated as a separate component if desired.

EXAMPLES 1 – 6

Oxalate components were prepared containing CPPO (0.133M, 0.100M, and 0.075M, respectively) and 9,10-bis(phenylethynyl)anthracene (0.003M) in dibutyl phthalate. The oxalate components were evaluated by mixing 7.5 mls. of the component with 2.5 mls. of peroxide component, comprising hydrogen peroxide (1.5M), and sodium salicylate (6.25 × $10^{-4}$M) in 80 volume percent dimethyl phthalate and 20 volume percent tertiary butanol, in a polyethylene tube at 27° C. ± 0.5° C., shaking well and measuring the intensity of the light emitted near the spectral maximum versus time by means of a broadband photometer. The initial concentrations of bis(6-carbopentoxy-2,4,5-trichlorophenyl)oxalate obtained in the reaction mixture with the above-mentioned components are 0.099M, 0.075M and 0.056M, respectively. The results in Table I clearly demonstrate that increased luminosity is obtained during the first 30 minutes with the lower initial concentrations, 0.075M and 0.056M, of CPPO.

TABLE I

| Ex. | [CPPO] | Luminosity (lm. $l^{-1}$)[a] | | | |
|---|---|---|---|---|---|
| | | 0 Min. | 10 Min. | 30 Min. | 60 Min. |
| 1 | 0.099M | 2000 | 270 | 176 | 80 |
| 2 | 0.075M | 2000 | 306 | 165 | 76 |
| 3 | 0.099M | 1550 | 233 | 155 | 42 |
| 4 | 0.099M | 1518 | 240 | 155 | 41 |
| 5 | 0.056M | 1780 | 277 | 185 | 29 |
| 6 | 0.056M | 1783 | 284 | 191 | 28 |

[a] lumens per liter.

EXAMPLES 7 – 12

The procedure of Examples 1 –6 was used except that each oxalate component contained 2-chloro-9,10-bis(-phenylethynyl)anthracene (0.005M) instead of 9,10-bis(-phenylethynyl)anthracene (0.003M). The results in Table II again demonstrate that increased luminosity values are obtained during the first 30 minutes with 0.075 and 0.056M initial concentrations of CPPO.

TABLE II

| Ex. | [CPPO] | Luminosity (lm. $l^{-1}$) | | | |
|---|---|---|---|---|---|
| | | 0 Min. | 10 Min. | 30 Min. | 60 Min. |
| 7 | 0.099M | 1389 | 201 | 137 | 46 |
| 8 | 0.099M | 1130 | 198 | 136 | 45 |
| 9 | 0.075M | 1402 | 218 | 150 | 35 |
| 10 | 0.075M | 1550 | 221 | 152 | 37 |
| 11 | 0.056M | 1462 | 234 | 154 | 22 |
| 12 | 0.056M | 1462 | 223 | 150 | 24 |

EXAMPLES 13 – 16

The procedure of Examples 1 – 6 was used except that oxalate components were prepared containing CPPO (0.20M and 0.10M, respectively) and 1-chloro-9,10-bis(phenylethynyl) anthracene (0.0065M) in dibutyl phthalate. The initial concentrations of CPPO obtained in the reaction mixture with the aforementioned oxalate components were 0.150M and 0.075M, respectively. The results in Table III demonstrate the increased luminosity obtained during the first 30 minutes of reaction with the lower initial concentration of CPPO.

TABLE III

| | | Luminosity (lm. $1^{-1}$) | | | |
|---|---|---|---|---|---|
| Ex. | [CPPO] | 0 Min. | 10 Min. | 30 Min. | 60 Min. |
| 13 | 0.150M | 3799 | 278 | 209 | 138 |
| 14 | 0.150M | 4145 | 254 | 199 | 143 |
| 15 | 0.075M | 4162 | 340 | 225 | 102 |
| 16 | 0.075M | 3816 | 328 | 216 | 98 |

I claim:

1. In a process for generating chemiluminescence comprising reacting bis(6-carbopentoxy-2,4,5-trichlorophenyl) oxalate with a peroxide component in a suitable diluent in the presence of a 9,10-bis(phenylethynyl)anthracene the improvement which comprises carrying out the reaction in sufficient diluent to provide an initial concentration of bis(6-carbopentoxy-2,4,5-trichlorophenyl)oxalate of about 0.05 to about 0.09 mole per liter of reaction mixture.

2. The improved process of claim 1 wherein the initial concentration of bis(6-carbopentoxy-2,4,5- trichlorophenyl)oxalate ranges from about 0.06 to about 0.08 mole per liter of reaction mixture.

3. The improved process of claim 1 wherein the 9,10-bis(phenylethynyl)anthracene is 9,10-bis(phenylethynyl) anthracene.

4. The improved process of claim 1 wherein the 9,10-bis(phenylethynyl)anthracene is 2-chloro-9,10bis(-phenylethynyl)anthracene.

5. The improved process of claim 1 wherein the 9,10-bis(phenylethynyl)anthracene is 1-chloro-9,10-bis(-phenylethynyl)anthracene.

* * * * *